US012695043B2

(12) United States Patent
Han et al.

(10) Patent No.: US 12,695,043 B2
(45) Date of Patent: Jul. 28, 2026

(54) SOLID-STATE CIRCUIT BREAKER

(71) Applicant: Schneider Electric (China) Co., Ltd., Beijing (CN)

(72) Inventors: Zhigang Han, Shanghai (CN); Yang Hu, Shanghai (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 217 days.

(21) Appl. No.: 18/515,589

(22) Filed: Nov. 21, 2023

(65) Prior Publication Data

US 2025/0037954 A1 Jan. 30, 2025

(30) Foreign Application Priority Data

Jul. 28, 2023 (CN) ........................ 202310944620.X

(51) Int. Cl.

*H01H 71/24* (2006.01)
*H01H 71/04* (2006.01)
*H01H 71/52* (2006.01)

(52) U.S. Cl.

CPC ............ *H01H 71/24* (2013.01); *H01H 71/04* (2013.01); *H01H 71/521* (2013.01)

(58) Field of Classification Search

CPC ...... H01H 71/24; H01H 71/04; H01H 71/521; H01H 71/123; H01H 71/52; H01H 71/02; H01H 71/10; H01H 71/50

USPC .............................. 200/3, 4; 361/2, 100, 102

See application file for complete search history.

(56) References Cited

U.S. PATENT DOCUMENTS

| | | | | |
|---|---|---|---|---|
| 4,245,204 A | | 1/1981 | Clausing et al. | |
| 4,295,025 A | | 10/1981 | Beatty, Jr. et al. | |
| 8,243,411 B2 * | | 8/2012 | Larson .................. | H01H 71/04 361/115 |

(Continued)

FOREIGN PATENT DOCUMENTS

| | | |
|---|---|---|
| CN | 212695050 U | 3/2021 |
| CN | 114975017 A | 8/2022 |
| CN | 217507237 U | 9/2022 |

OTHER PUBLICATIONS

Extended European Search Report dated Apr. 29, 2024 for corresponding European Patent Application No. 23211177.3-1201, 8 pages.

*Primary Examiner* — William A Bolton

(74) *Attorney, Agent, or Firm* — Wolf, Greenfield & Sacks, P.C.

(57) ABSTRACT

The present disclosure discloses a solid-state circuit breaker, including an electronic switch and a mechanical switch connected in series, the mechanical switch includes: a housing; a handle, rotatably installed to the housing and capable of stopping at an on position, an charged position, and an off position between the on position and the charged position; a movable contact and a stationary contact; and a transmission assembly, configured to transmit a motion of the handle to the movable contact to achieve contact and separation with the stationary contact; upon the handle being in the on position, the mechanical switch is on; upon the handle being in the off position, the mechanical switch is off, and the transmission assembly is in a tripping state; upon the handle being in the charged position, the mechanical switch is off, and the transmission assembly is in a non-tripping state.

20 Claims, 5 Drawing Sheets

(56) References Cited

U.S. PATENT DOCUMENTS

| | | | | |
|---|---|---|---|---|
| 8,476,992 | B2 * | 7/2013 | Yang | H01H 71/505 335/167 |
| 10,395,864 | B2 * | 8/2019 | Court | H01H 71/52 |
| 11,211,219 | B2 * | 12/2021 | Gottschalk | H01H 1/06 |
| 11,368,010 | B2 * | 6/2022 | Lichauer | H02H 1/0007 |
| 11,398,724 | B1 * | 7/2022 | Yang | H02H 1/0007 |
| 2022/0037917 | A1 * | 2/2022 | Degli Innocenti | H02H 7/222 |
| 2022/0209765 | A1 * | 6/2022 | Song | H01C 7/12 |

* cited by examiner

SOLID-STATE CIRCUIT BREAKER

CROSS-REFERENCE TO RELATED APPLICATIONS

This application claims priority under 35 U.S.C. § 119(d) to Chinese Patent Application No. 202310944620.X, filed Jul. 28, 2023, which is hereby incorporated herein by reference in its entirety.

TECHNICAL FIELD

The present disclosure relates to a solid-state circuit breaker.

BACKGROUND

Solid-state circuit breaker controls the on and off of a circuit through the principle of electronic components. Because of its advantages of short breaking time, no arc upon breaking, long electrical life and no noise, the solid-state circuit breaker is suitable for various applications of AC and DC.

The solid-state circuit breaker includes an electronic switch and a mechanical switch connected in series. How to design the mechanical switch to meet the requirements of solid-state circuit breakers is a difficult point in the industry.

SUMMARY

With regard to at least one of the above problems, a solid-state circuit breaker is proposed, the solid-state circuit breaker includes an electronic switch and a mechanical switch connected in series, the mechanical switch includes: a housing; a handle, rotatably installed to the housing and capable of stopping at an on position, an charged position, and an off position between the on position and the charged position; a movable contact and a stationary contact, the movable contact is configured to be movable between an open position and a closed state, in the open position, the movable contact is not in contact with the stationary contact, and in the closed position, the movable contact is in contact with the stationary contact; and a transmission assembly, configured to transmit a motion of the handle to the movable contact to achieve contact and separation with the stationary contact, upon the handle being in the on position, the mechanical switch is on; upon the handle being in the off position, the mechanical switch is off, and the transmission assembly is in a tripping state; upon the handle being in the charged position, the mechanical switch is off, and the transmission assembly is in a non-tripping state.

The handle of the solid-state circuit breaker according to the present disclosure will stop at the off position regardless of the manually opening process or the electrically opening process, and stop at the charged position upon the tripping being released after switching-off, and stop at the on position after switching-on, so that the position of the handle can clearly and correctly indicate the state of the mechanical switch.

The solid-state circuit breaker according to the present disclosure may have one or more of the following features.

According to an embodiment, the solid-state circuit breaker further includes an charged micro-switch installed to the housing and configured to be actuated upon the handle rotating to the charged position and be released upon the handle leaving the charged position, so that the charged position can be electrically captured.

According to an embodiment, the mechanical switch includes an charged micro-switch actuator, and the motion of the handle drives the charged micro-switch actuator to move, and the charged micro-switch is arranged close to an end point of a motion path of the charged micro-switch actuator during a motion process of the handle towards the charged position, so that the charged micro-switch actuator is driven by the handle, and actuates the charged micro-switch to an on state of the charged micro-switch upon the handle moving to the charged position, and the charged micro-switch actuator is driven by the handle, and release the charged micro-switch to an off state of the charged micro-switch upon the handle leaving the charged position.

According to an embodiment, the solid-state circuit breaker further includes: a handle micro-switch, installed to the housing and configured to be actuated upon the handle rotating to the on position and be released upon the handle leaving the on position, so that the handle micro-switch is in an on state of the handle micro-switch upon the handle being in the on position, and the handle micro-switch is in an off state of the handle micro-switch upon the handle leaving the off position for a certain stroke; a contact micro-switch, installed to the housing and configured to be actuated upon the movable contact moving to a closed position and released upon the movable contact leaving the closed position, so that the contact micro-switch is in an on state of the contact micro-switch upon the movable contact being in the closed position and the contact micro-switch is in an off state of the contact micro-switch upon the movable contact leaving the closed position, by detecting states of the handle micro-switch and the contact micro-switch, it is achieved that, upon the solid-state circuit breaker being switched from off to on, the mechanical switch is switched on first, and then the electronic switch is switched on, upon the solid-state circuit breaker being switched from on to off, the electronic switch is switched off first, and then the mechanical switch is switched off.

According to an embodiment, the transmission assembly includes a contact micro-switch actuator, and the contact micro-switch is arranged close to an end point of a motion path of the contact micro-switch actuator during a closing process, so that the contact micro-switch actuator actuates the contact micro-switch to an on state of the contact micro-switch upon the transmission assembly driving the movable contact to move to the closed position, and the contact micro-switch actuator releases the contact micro-switch to an off state of the contact micro-switch upon the transmission assembly driving the movable contact to leave the closed position.

According to an embodiment, the mechanical switch includes a handle micro-switch actuator, the motion of the handle drives the handle micro-switch actuator to move, the handle micro-switch is arranged close to an end point of a motion path of the handle micro-switch actuator in a closing process, so that the handle micro-switch actuator is driven by the handle and actuates the handle micro-switch to an on state of the handle micro-switch upon the handle moving to the on position, and the handle micro-switch actuator is driven by the handle and releases the handle micro-switch to an off state of the handle micro-switch upon the handle leaving to the on position.

According to an embodiment, in a manually closing case: the handle is manually rotated from the charged position to the on position, and the motion of the handle is transmitted to the movable contact through the transmission assembly, so that the movable contact moves from the open position to the closed position, upon the movable contact reaching the closed position, the contact micro-switch is actuated to the on state of the contact micro-switch, and the mechanical switch is turned on, meanwhile, upon the handle moving to the on position, the handle micro-switch is actuated to the on state of the handle micro-switch, at this time, the solid-state circuit breaker reaches a hot standby state, upon the solid-state circuit breaker is in the hot standby state, if the electronic switch is turned on, the solid-state circuit breaker is turned on.

According to an embodiment, the solid-state circuit breaker further includes a tripping unit configured to be able to trip upon being electrically driven, so that the transmission assembly is actuated to switch the movable contact from the closed position to the open position and switch the handle from the on position to the off position.

According to an embodiment, the tripping unit includes: an electromagnet, configured to act upon being energized; a tripping lever, pushed by the electromagnet upon the electromagnet acting, so that the transmission assembly is able to quickly open the movable contact and switch the handle to the off position under an action of a main spring connected between the handle and the transmission assembly.

According to an embodiment, in an electrically opening case: the electronic switch is turned off, and then the tripping unit is electrically driven, the transmission assembly is actuated to drive the movable contact to move from the closed position to the open position, upon the movable contact leaving the closed position, the contact micro-switch is released to the off state of the contact micro-switch, upon the movable contact reaching the open position, the mechanical switch is turned off and the solid-state circuit breaker is turned off, meanwhile, the transmission assembly is actuated to drive the handle to move from the on position to the off position, upon the handle leaving the on position, the handle micro-switch is released to the off state of the handle micro-switch, and the handle finally stops at the off position.

According to an embodiment, in a manually opening case: the handle is manually rotated from the on position to the off position, upon the handle leaving the on position, the handle micro-switch is released to the off state of the handle micro-switch, at this time, in response to the off state of the handle micro-switch, the electronic switch is turned off, and then the tripping unit is electrically driven, the transmission assembly is actuated to drive the movable contact to move from the closed position to the open position, upon the movable contact leaving the closed position, the contact micro-switch is released to the off state of the contact micro-switch, upon the movable contact reaching the open position, the mechanical switch is turned off, so that the solid-state circuit breaker is turned off, and the handle stops at the off position.

According to an embodiment, in a manually opening case upon the electromagnet fails: the handle is manually rotated from the on position, upon the handle leaving the on position, the handle micro-switch is released to the off state of the handle micro-switch, at this time, in response to the off state of the handle micro-switch, the electronic switch is turned off, however, the tripping unit cannot trip due to failure of the electromagnet, and the handle cannot be stopped at the off position, and then the handle is continuously rotated to the charged position, so that the movable contact is manually driven to reach the open position, and the mechanical switch is turned off, so that the solid-state circuit breaker is turned off, and the handle stops at the charged position.

According to an embodiment, the handle being not able to stop at the off position in the manually opening case indicates that the electromagnet fails.

According to an embodiment, the solid-state circuit breaker includes a plurality of breaking units and a drive linkage configured to synchronize the plurality of breaking units, wherein the drive linkage is connected to the plurality of breaking units and configured to link movable contacts of the plurality of breaking units.

BRIEF DESCRIPTION OF DRAWINGS

In order to explain the technical solution of the embodiment of the present disclosure more clearly, the accompanying drawings of the embodiment of the present disclosure will be briefly introduced below. The accompanying drawings are only used to show some embodiments of the present disclosure, and are not limited to all embodiments of the present disclosure. Moreover, in order to show the components that need to be shown, some components are hidden in some drawings.

LIST OF REFERENCE NUMERALS

Figure 1:
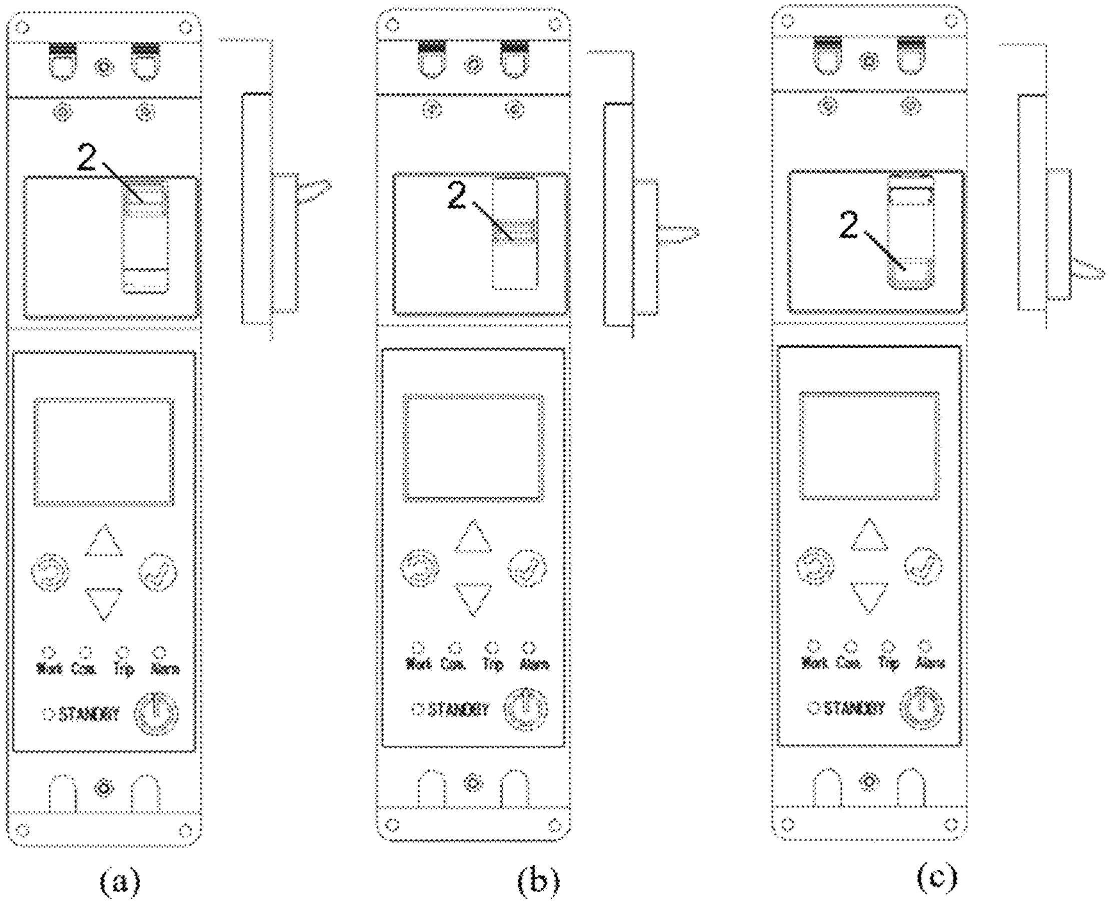
FIG. 1 is a front view of an external structure of a solid-state circuit breaker according to the present disclosure and a side view showing a position of a handle, in which (a) the handle is in an on position, (b) the handle is in an off position, and (c) the handle is in an charged position.

2—handle
3—stationary contact
4—movable contact
5—transmission assembly
6—charged micro-switch
61—charged micro-switch linkage
62—handle side plate
7—handle micro-switch
71—handle micro-switch actuator
8—contact micro-switch
81—contact micro-switch linkage
82—spindle
91—electromagnet
92—tripping lever
10—breaking unit
11—transmission linkage

DETAILED DESCRIPTION

In order to make the purpose, technical solution and advantages of the technical solution of the present disclosure more clear, the technical solution of the embodiments of the present disclosure will be described clearly and completely in the following with the accompanying drawings of specific embodiments of the present disclosure. The same reference numerals in the drawings represent the same components. It should be noted that the described embodiments are a part of the embodiments of the present disclosure, not all the embodiments. Based on the described embodiments of the present disclosure, all other embodiments obtained by ordinary skilled in the field without creative labor belong to the protection scope of the present disclosure.

Unless otherwise defined, technical terms or scientific terms used herein shall have their ordinary meanings as understood by people with ordinary skills in the field to which the present disclosure belongs. The words "first", "second" and similar words used in the specification and claims of the patent application of the present disclosure do not indicate any order, quantity or importance, but are only used to distinguish different components. Similar words such as "including" or "containing" refer to that the elements or objects appearing before the word cover the elements or objects listed after the word and their equivalents, without excluding other elements or objects. Similar words such as "connected" or "connected" are not limited to physical or mechanical connection, but can include electrical connection, whether direct or indirect. "Up", "Down", "Left" and "Right" are only used to indicate the relative positional relationship. When the absolute position of the described object changes, the relative positional relationship may also change accordingly.

Hereinafter, the present disclosure will be described in detail below by describing example embodiments.

The solid-state circuit breaker according to the present disclosure includes an electronic switch and a mechanical switch connected in series, and a heat dissipation module. The electronic switch, also known as semiconductor switch, can be controlled by receiving an electrical signal. The mechanical switch can achieve the mechanical opening and closing of a circuit, provide mechanical indications of on and off, and the state of the mechanical switch can be transmitted to the electronic switch.

Figure 2:
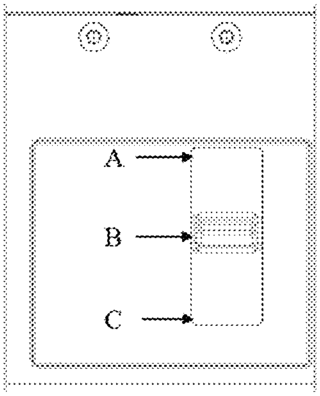
FIG. 2 is an enlarged view showing positions of the handle of the solid-state circuit breaker.
Figure 3:
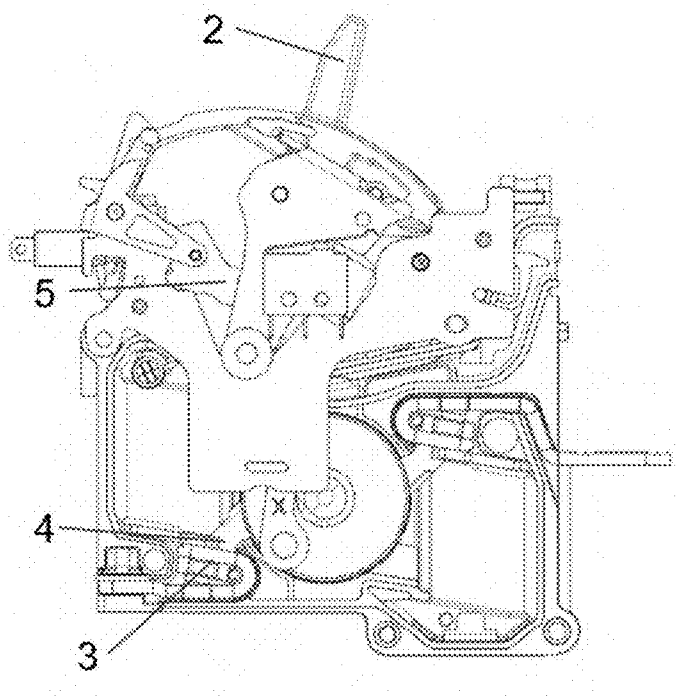
FIG. 3 is a side view showing a mechanical switch of the solid-state circuit breaker according to the present disclosure.

As illustrated by FIG. 3, the mechanical switch may include a housing; a handle 2, rotatably installed to the housing and capable of stopping at an on position (ON, the position shown in (a) in FIG. 1, the position A in FIG. 2, in this case, the mechanical switch is on), an charged position (Charged, the position shown in (c) in FIG. 1, and the position C in FIG. 2, in this case, the mechanical switch is off and the transmission assembly is in a non-tripping state), and an off position (OFF, the position shown in (b) in FIG. 1, the position B in FIG. 2, in this case, the mechanical switch is off and the transmission assembly is in a tripping state) located between the on position and the charged position; a movable contact 4 and a stationary contact 3, the movable contact 4 is configured to be movable between an open position and a closed position, in the open position, the movable contact 4 is not in contact with the stationary contact 3, and in the closed position, the movable contact 4 is in contact with the stationary contact 3; a transmission assembly 5, configured to transmit a motion of the handle 2 to the movable contact 4 to achieve contact and separation with the stationary contact 3; and a main spring (not shown), connected between the handle 2 and the transmission assembly 5.

The mechanical switch of the solid-state circuit breaker according to the present disclosure uses a four-bar mechanism of a traditional molded case circuit breaker for transmission, so the transmission process of the transmission assembly 5, the main spring, the movable contact 4, etc. will not be described in detail. However, under normal circumstances, regardless of the manually opening process or the electrically opening process, the handle 2 according to the present disclosure will stop at the off position B shown in FIG. 2, instead of stopping at position C in the manually opening process and stopping at the position B in the electrically opening process, which is unlike the traditional four-bar mechanism, thus solving the problem of chaotic indications of the off positions.

Figure 4:
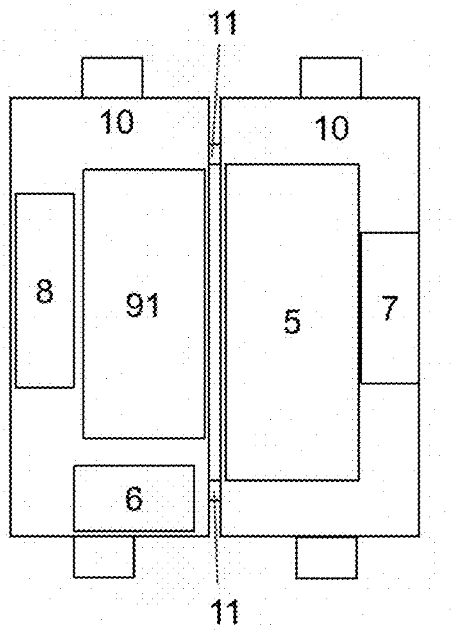
FIG. 4 is a block diagram showing the structure of a mechanical switch of the solid-state circuit breaker according to the present disclosure.
Figure 5:
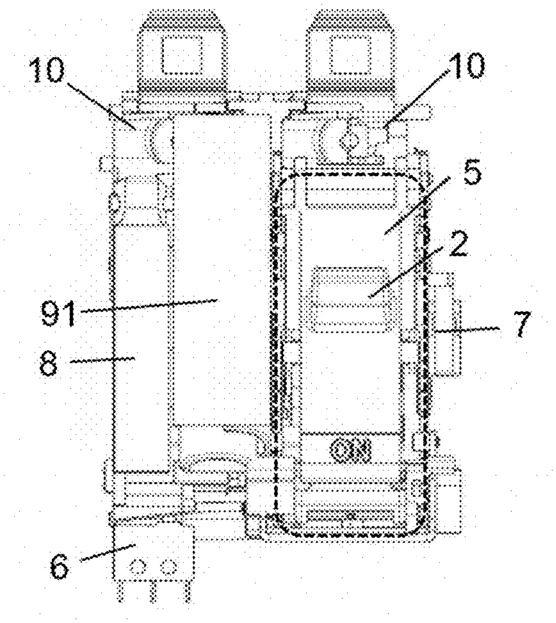
FIG. 5 is a plan view showing the structure of a mechanical switch of the solid-state circuit breaker according to the present disclosure.

FIG. 4 is a block diagram showing the structure of a mechanical switch of the solid-state circuit breaker according to the present disclosure. FIG. 5 is a plan view showing the structure of a mechanical switch of the solid-state circuit breaker according to the present disclosure. Referring to FIGS. 4 and 5, the mechanical switch of the solid-state circuit breaker according to an embodiment of the present disclosure may further include an charged micro-switch 6, a handle micro-switch 7 and a contact micro-switch 8. The charged micro-switch 6, the handle micro-switch 7 and the contact micro-switch 8 are installed to the housing respectively, and are configured in appropriate positions according to functions.

Figure 6:
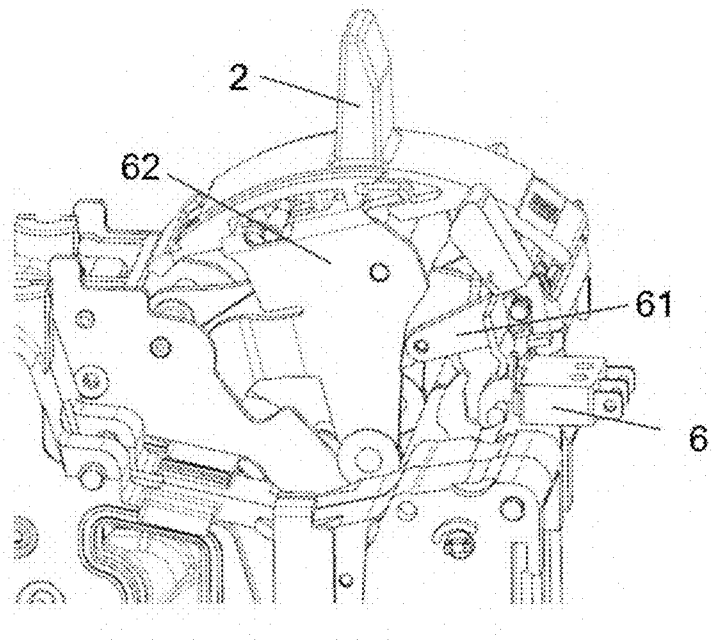
FIG. 6 is a perspective view showing a position of an charged micro-switch of the solid-state circuit breaker according to the present disclosure.

The charged micro-switch 6 is configured to be actuated upon the handle 2 rotating to the charged position and be released upon the handle 2 leaving the charged position, so that the charged position of the handle 2 can be electrically captured. Specifically, the mechanical switch may include an charged micro-switch actuator, the motion of the handle 2 can drive the charged micro-switch actuator to move, and the charged micro-switch is arranged close to an end point of a motion path of the charged micro-switch actuator during a motion process of the handle towards the charged position, so that the charged micro-switch actuator is driven by the handle 2 and drives the charged micro-switch 6 to an on state of the charged micro-switch upon the handle 2 moving to the charged position, and the charged micro-switch actuator is driven by the handle 2 and releases the charged micro-switch 6 to an off state of the charged micro-switch 6 upon the handle 2 leaving the charged position. In the embodiment of FIG. 6, the charged micro-switch actuator includes an charged micro-switch linkage 61 and a handle side plate 62, the charged micro-switch linkage 61 is rotatably installed to the housing and the handle side plate 62 moves synchronously with the handle 2. Upon the handle 2 approaching the on position, the handle side plate 62 abuts against the charged micro-switch linkage 61 and drives the charged micro-switch linkage 61 to rotate, so that the charged micro-switch linkage 61 actuates the charged micro-switch 6 to the on state of the charged micro-switch. Upon the handle 2 leaving the on position, the handle side plate 62 is far away from the charged micro-switch linkage 61, and the charged micro-switch linkage 61 resets and releases the charged micro-switch 6 to the off state of the charged micro-state. By setting the charged micro-switch 6, it is convenient to detect whether the handle 2 is in the charged position, so as to control the solid-state circuit breaker according to whether the handle 2 is in the charged position (that is, whether the transmission assembly 5 is in the tripping position), for example, the charged position can be electrically captured, and the off position and the charged position of the handle can be distinguished, thus facilitating the expansion of the automatic closing function in the future.

Figure 7:
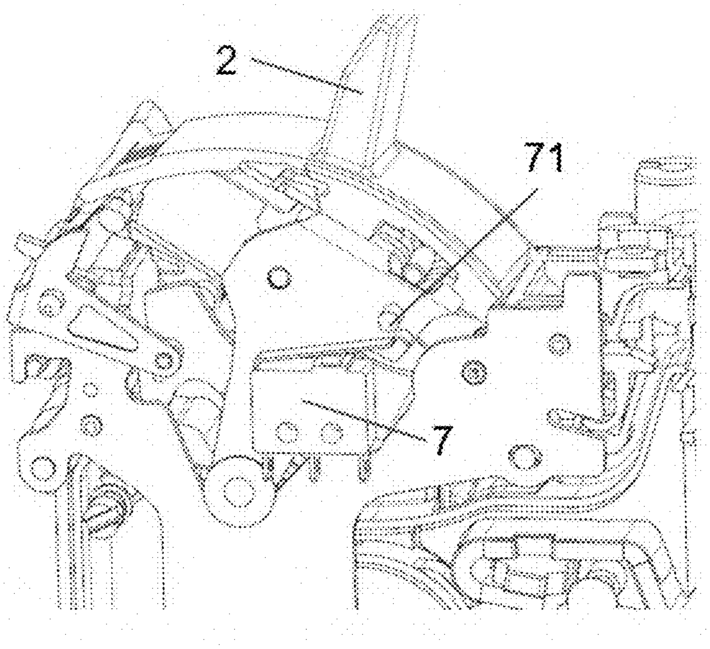
FIG. 7 is a perspective view showing a position of a handle micro-switch of the solid-state circuit breaker according to the present disclosure.

The handle micro-switch 7 is configured to be actuated upon the handle 2 rotating to the on position and be released upon the handle 2 leaving the closed position, so that the handle micro-switch 7 is in an on state of the handle micro-switch upon the handle 2 being in the on position, and the handle micro-switch 7 is in an off state of the handle micro-switch upon the handle 2 leaving the on position for a certain stroke. Specifically, the handle micro-switch actuator 71 configured to actuate and release the handle micro-switch 7 may be provided on the handle 2 or the transmission assembly 5. The motion of the handle 2 between the on position and the off position drives the handle micro-switch actuator 71 to move, and the handle micro-switch 7 is arranged close to an end point of a motion path of the handle micro-switch actuator 71 during the closing process, so that the handle micro-switch actuator 71 is driven by the handle 2 and drives the handle micro-switch 7 to the on state of the handle micro-switch upon the handle 2 moving to the on position, and the handle micro-switch actuator 71 is driven by the handle 2 and releases the handle micro-switch 7 to an off state of the handle micro-switch upon the handle 2 leaving the on position. In the embodiment of FIG. 7, the handle micro-switch actuator 71 is an actuating protrusion protruded from the handle side plate. By setting the handle micro-switch 7, it is convenient to detect whether the handle 2 is in the on position, so as to control the solid-state circuit breaker according to whether the handle 2 is in the on position.

Figure 8:
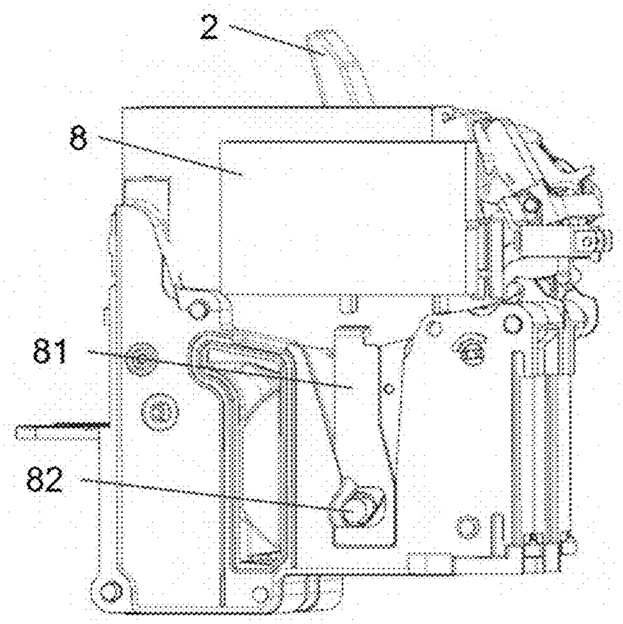
FIG. 8 is a perspective view showing a position of a contact micro-switch of the solid-state circuit breaker according to the present disclosure.

The contact micro-switch 8 is configured to be actuated upon the movable contact 4 moving to the closed position and be released upon the movable contact 4 leaving the closed position, so that the contact micro-switch 8 is in an on state of the contact micro-switch upon the movable contact 4 being in the closed position, and the contact micro-switch 8 is in an off state of the contact micro-switch upon the movable contact 4 leaving the closed position. Specifically, the transmission assembly 5 may include a contact micro-switch actuator configured to actuate and release the contact micro-switch 8. For example, the contact micro-switch 8 is arranged close to an end point of a motion path of the contact micro-switch actuator during the closing process, so that the contact micro-switch 8 is actuated to the on state of the contact micro-switch upon the transmission assembly 5 driving the movable contact 4 to the closed position, and the contact micro-switch 8 is released to the off state of the contact micro-switch upon the transmission assembly 5 driving the movable contact 4 to leave the closed position. In the embodiment of FIG. 8, the contact micro-switch actuator can be a contact micro-switch linkage 81 connected to a spindle 82, and the spindle 82 moves along with the movable contact, thereby driving the contact micro-switch linkage 81 to move, so as to actuate and release the contact micro-switch 8. By setting the contact micro-switch 8, it is convenient to detect whether the movable contact 4 is in the closed position, so as to control the solid-state circuit breaker according to whether the movable contact 4 is in the closed position (that is, whether the mechanical switch is in the on state).

By adding the handle micro-switch 7 and the contact micro-switch 8, the state of the handle 2 and the state of the movable contact 4 can be conveniently detected, and then the solid-state circuit breaker can be conveniently controlled, so that the mechanical switch is turned on first, and then the electronic switch is turned on upon the solid-state circuit breaker being switched from off to on, and the electronic switch is turned off first and then the mechanical switch is turned off later upon the solid-state circuit breaker being switched from on to off.

Figure 9:
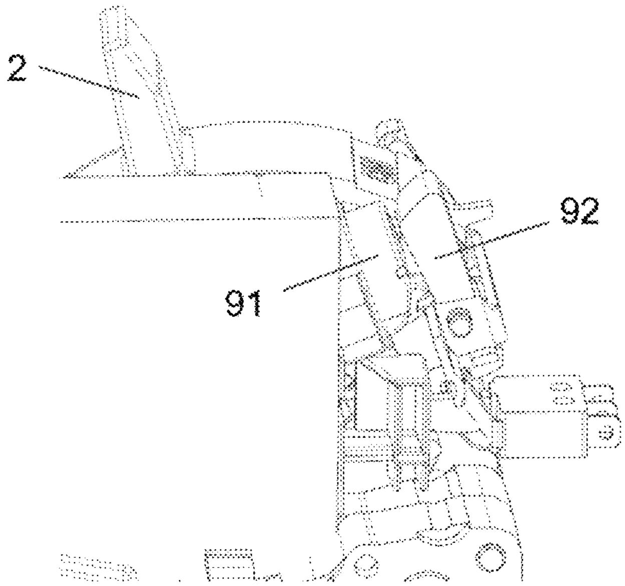
FIG. 9 is a perspective view showing a tripping unit of the solid-state circuit breaker according to the present disclosure.

The solid-state circuit breaker according to the present disclosure may further include a tripping unit configured to be able to trip upon being electrically driven, so that the transmission assembly 5 is actuated to a tripping state, the movable contact 4 is switched from a closed position to an open position, and the handle 2 is switched from a on position to an off position. That is to say, the solid-state circuit breaker according to the present disclosure can have a tripping function being electrically driven, and the tripping function can be performed through the control of an electrical signal. Specifically, referring to FIG. 9, the electrically driven tripping unit may include an electromagnet 91 and a tripping lever 92, and the electromagnet 91 acts upon being energized, and pushes the tripping lever 92 to trigger the trip, so that the transmission assembly 5 is able to quickly open the movable contact 4 and switch the handle 2 to the off position under the action of the main spring. Because the electromagnet 91 pushes the tripping lever 92 during tripping, the four-bar mechanism of the transmission assembly is changed into a five-bar mechanism, and the energy of the main spring is utilized, so that the movable contact 4 can be instantly opened under the condition of a small tripping force, and it is convenient to select the electromagnet 91 with less power consumption. Upon the transmission assembly 5 being in the tripping state, the closing operation cannot be carried out, and the transmission assembly 5 needs to be restored to the non-tripping state before closing. Specifically, upon the handle 2 being actuated from the off position to the charged position, the transmission assembly 5 is restored from the tripping state to the non-tripping state.

The solid-state circuit breaker according to the present disclosure may have a plurality of levels. Upon having a plurality of levels, the solid-state circuit breaker may include a plurality of breaking units 10 and a drive linkage 11 configured to synchronize the breaking units 10, and the drive linkage 11 is connected to the plurality of breaking units 10 and configured to link the movable contacts 4 of the plurality of breaking units 10. Specifically, as illustrated by FIG. 4, the drive linkage 11 may be a connection shaft connected to the plurality of breaking units 10.

Returning to FIGS. 4 and 5, the electromagnet 91 of the mechanical switch of the solid-state circuit breaker according to the present disclosure can be arranged at a side of the transmission assembly 5, and three micro-switches can be installed from three directions. The whole layout and design are particularly compact.

In addition, through the design of mechanical switch, it can be achieved that the rated current that the mechanical breakpoint can bear can be up to 160 A under the condition of meeting UL standard (can be turned on and off for 3 times under 6 In current).

Hereinafter, the logic design of various state switching of the solid-state circuit breaker according to the present disclosure will be described. It should be noted that, because the mechanical switch and the electronic switch of the solid-state circuit breaker are connected in series, upon both the mechanical switch and the electronic switch being in the on state, the solid-state circuit breaker is in the on state; upon both the mechanical switch and the electronic switch being in the off state, the solid-state circuit breaker is in the off state; upon the mechanical switch being in the on state and the electronic switch being in the off state, the solid-state circuit breaker is in a hot standby state; upon the solid-state circuit breaker being in the hot standby state, as long as the electronic switch is turned on by an electric signal, the solid-state circuit breaker will enter the on state. Further, according to the present disclosure, upon the solid-state circuit breaker being in the on state, the handle 2 is in the on position; upon the solid-state circuit breaker being in the off state, if the transmission component is in the tripping state, the handle 2 is in the off position, if transmission component is in the non-tripping state, the handle 2 is in the charged position.

In the manually closing case: the handle 2 is manually rotated from the charged position to the on position, and the motion of the handle 2 is transmitted to the movable contact through the transmission assembly 5, so that the movable contact 4 moves from the open position to the closed position, upon the movable contact 4 reaching the closed position, the contact micro-switch 8 is actuated to the on state of the contact micro-switch, and the mechanical switch is turned on, meanwhile, upon the handle 2 moving to the on position, the handle micro-switch 7 is actuated to the on state of the handle micro-switch, at this time, the solid-state circuit breaker reaches a hot standby state, if the electronic switch is turned on, the solid-state circuit breaker is turned on.

In the electrically opening case: the electronic switch is turned off, and then the tripping unit is electrically driven, the transmission assembly 5 is actuated to drive the movable contact to move from the closed position to the open position under the action of the main spring, upon the movable contact 4 leaving the closed position, the contact micro-switch 8 is released to the off state of the contact micro-switch, upon the movable contact 4 reaching the open position, the mechanical switch is turned off and the solid-state circuit breaker is turned off, meanwhile, the transmission assembly 5 is actuated to drive the handle 2 to move from the on position to the off position, upon the handle 2 leaving the on position, the handle micro-switch 7 is released to the off state of the handle micro-switch, and the handle 2 finally stops at the off position.

In the manually opening case: the handle 2 is manually rotated from the on position to the off position, upon the handle 2 leaving the on position, the handle micro-switch 7 is released to the off state of the handle micro-switch, at this time, in response to the off state of the handle micro-switch 7, the electronic switch is turned off, and then the tripping unit is electrically driven, the transmission assembly 5 is actuated to drive the movable contact 4 to move from the closed position to the open position under the action of the main spring, upon the movable contact 4 leaving the closed position, the contact micro-switch 8 is released to the off state of the contact micro-switch, upon the movable contact 4 reaching the open position, the mechanical switch is turned off, so that the solid-state circuit breaker is turned off, and the handle stops at the off position.

It should be noted that, in the manually opening case, although the handle 2 is manually rotated from the on position to the off position, theoretically, the handle 2 will drive the transmission assembly 5 to drive the movable contact 4 to move to the open position, however, because the off state of the handle micro-switch triggers the electronic switch to be turned off, and further triggers the electrically driven tripping unit, and the electrically driven tripping process is usually faster than the mechanical transmission, so the driving force of the transmission assembly 6 and the movable contact 4 from the closed position to the open position comes from the electrically driven tripping unit, not from the handle 2. In addition, because the handle micro-switch 7 can be released upon the handle 2 leaving the off position, and then the electrically driven tripping process is triggered to drive the movable contact 4 to the open position. Therefore, even if the operator repents in the process of manually rotating the handle 2 from the on position to the off position or the handle 2 is stuck in the process, the mechanical switch of the solid-state circuit breaker will be electrically driven to the off state, thus ensuring the circuit safety.

Especially, in the manually opening case upon the electromagnet 91 fails: the handle 2 is manually rotated from the on position, upon the handle 2 leaving the on position, the handle micro-switch 7 is released to the off state of the handle micro-switch, at this time, in response to the off state of the handle micro-switch, the electronic switch is turned off, however, the tripping unit cannot trip due to failure of the electromagnet 91, and the handle 2 cannot be stopped at the off position, and then the handle needs to be continuously rotated to the charged position, so that the movable contact 4 is manually driven to reach the open position, and the mechanical switch is turned off, so that the solid-state circuit breaker is turned off, and the handle stops at the charged position.

It should be noted that the dead point of the main spring is located between the off position and the charged position. Upon the electromagnet 91 failing, if the user only actuates the handle 2 to the off position, the handle 2 will return to the on position under the action of the main spring and cannot stop at the off position, so manually opening process can only actuate the handle 2 to the charged position at this time. Then, the handle 2 being not able to stop at the off position in the manually opening case will indicate to the user that the electromagnet 91 fails.

The exemplary implementation of the solid-state circuit breaker proposed by the present disclosure has been described in detail above with reference to the preferred embodiment. However, it can be understood by those skilled in the art that various variations and modifications can be made to the above specific embodiment without departing from the concept of the present disclosure, and various technical features and structures proposed by the present disclosure can be combined in various ways without exceeding the protection scope of the present disclosure.

The invention claimed is:

1. A solid-state circuit breaker, comprising an electronic switch and a mechanical switch connected in series, wherein the mechanical switch comprises:

a housing;

a handle, rotatably installed to the housing and capable of stopping at:

an on position, a charged position, and an off position between the on position and the charged position;

a movable contact and a stationary contact, wherein the movable contact is configured to be movable between:

an open position in which the movable contact is not in contact with the stationary contact, and a closed position in which the movable contact is in contact with the stationary contact; and a transmission assembly configured to transmit a motion of the handle to the movable contact to achieve the open position and the closed position, wherein:

upon the handle being in the on position, the mechanical switch is on;

upon the handle being in the off position, the mechanical switch is off and the transmission assembly is in a tripping state; and upon the handle being in the charged position, the mechanical switch is off and the transmission assembly is in a non-tripping state.

2. The solid-state circuit breaker according to claim 1, wherein the solid-state circuit breaker further comprises a charged micro-switch installed to the housing and configured to be actuated upon the handle rotating to the charged position and be released upon the handle leaving the charged position, so that the charged position can be electrically captured.

3. The solid-state circuit breaker according to claim 2, wherein the mechanical switch comprises an charged micro-switch actuator, and motion of the handle drives the charged micro-switch actuator to move, and the charged micro-switch is arranged close to an end point of a motion path of the charged micro-switch actuator during a motion process of the handle towards the charged position, so that the charged micro-switch actuator is driven by the handle, and actuates the charged micro-switch to an on state of the charged micro-switch upon the handle moving to the charged position, and the charged micro-switch actuator is driven by the handle, and release the charged micro-switch to an off state of the charged micro-switch upon the handle leaving the charged position.

4. The solid-state circuit breaker according to claim 2, further comprising:

a handle micro-switch, installed to the housing and configured to be actuated upon the handle rotating to the on position and be released upon the handle leaving the on position, so that the handle micro-switch is in an on state of the handle micro-switch upon the handle being in the on position, and the handle micro-switch is in an off state of the handle micro-switch upon the handle leaving the off position for a certain stroke; and a contact micro-switch, installed to the housing and configured to be actuated upon the movable contact moving to a closed position and be released upon the movable contact leaving the closed position, so that the contact micro-switch is in an on state of the contact micro-switch upon the movable contact being in the closed position and the contact micro-switch is in an off state of the contact micro-switch upon the movable contact leaving the closed position, wherein, by detecting states of the handle micro-switch and the contact micro-switch:

upon the solid-state circuit breaker being switched from off to on, the mechanical switch is switched on first, and then the electronic switch is switched on, and upon the solid-state circuit breaker being switched from on to off, the electronic switch is switched off first, and then the mechanical switch is switched off.

5. The solid-state circuit breaker according to claim 4, wherein the transmission assembly comprises a contact micro-switch actuator, and the contact micro-switch is arranged close to an end point of a motion path of the contact micro-switch actuator during a closing process, so that the contact micro-switch actuator actuates the contact micro-switch to an on state of the contact micro-switch upon the transmission assembly driving the movable contact to move to the closed position, and the contact micro-switch actuator releases the contact micro-switch to an off state of the contact micro-switch upon the transmission assembly driving the movable contact to leave the closed position.

6. The solid-state circuit breaker according to claim 4, wherein the mechanical switch comprises a handle micro-switch actuator, the motion of the handle drives the handle micro-switch actuator to move, the handle micro-switch is arranged close to an end point of a motion path of the handle micro-switch actuator in a closing process, so that the handle micro-switch actuator is driven by the handle and actuates the handle micro-switch to an on state of the handle micro-switch upon the handle moving to the on position, and the handle micro-switch actuator is driven by the handle and releases the handle micro-switch to an off state of the handle micro-switch upon the handle leaving to the on position.

7. The solid-state circuit breaker according to claim 4, wherein, in a manually closing case:

the handle is manually rotated from the charged position to the on position, and the motion of the handle is transmitted to the movable contact through the transmission assembly, so that the movable contact moves from the open position to the closed position, upon the movable contact reaching the closed position, the contact micro-switch is actuated to the on state of the contact micro-switch, and the mechanical switch is turned on, meanwhile, upon the handle moving to the on position, the handle micro-switch is actuated to the on state of the handle micro-switch, at this time, the solid-state circuit breaker reaches a hot standby state, and upon the solid-state circuit breaker being in the hot standby state, if the electronic switch is turned on, the solid-state circuit breaker is turned on.

8. The solid-state circuit breaker according to claim 4, further comprising a tripping unit configured to be able to trip upon being electrically driven, so that the transmission assembly is actuated to switch the movable contact from the closed position to the open position and switch the handle from the on position to the off position.

9. The solid-state circuit breaker according to claim 8, wherein the tripping unit comprises:

an electromagnet, configured to act upon being energized; and a tripping lever, pushed by the electromagnet upon the electromagnet acting, so that the transmission assembly is able to quickly open the movable contact and switch the handle to the off position under an action of a main spring connected between the handle and the transmission assembly.

10. The solid-state circuit breaker according to claim 9, wherein, in a manually opening case upon the electromagnet fails:

the handle is manually rotated from the on position, upon the handle leaving the on position, the handle micro-switch is released to the off state of the handle micro-switch, at this time, in response to the off state of the handle micro-switch, the electronic switch is turned off, however, the tripping unit cannot trip due to failure of the electromagnet, and the handle cannot be stopped at the off position, and then the handle is continuously rotated to the charged position, so that the movable contact is manually driven to reach the open position, and the mechanical switch is turned off, so that the solid-state circuit breaker is turned off, and the handle stops at the charged position.

11. The solid-state circuit breaker according to claim 10, wherein the handle being not able to stop at the off position in the manually opening case indicates that the electromagnet fails.

12. The solid-state circuit breaker according to claim 8, wherein, in an electrically opening case:

the electronic switch is turned off, and then the tripping unit is electrically driven, the transmission assembly is actuated to drive the movable contact to move from the closed position to the open position, upon the movable contact leaving the closed position, the contact micro-switch is released to the off state of the contact micro-switch, upon the movable contact reaching the open position, the mechanical switch is turned off and the solid-state circuit breaker is turned off, meanwhile, the transmission assembly is actuated to drive the handle to move from the on position to the off position, upon the handle leaving the on position, the handle micro-switch is released to the off state of the handle micro-switch, and the handle finally stops at the off position.

13. The solid-state circuit breaker according to claim 8, wherein, in a manually opening case:

the handle is manually rotated from the on position to the off position, upon the handle leaving the on position, the handle micro-switch is released to the off state of the handle micro-switch, at this time, in response to the off state of the handle micro-switch, the electronic switch is turned off, and then the tripping unit is electrically driven, the transmission assembly is actuated to drive the movable contact to move from the closed position to the open position, upon the movable contact leaving the closed position, the contact micro-switch is released to the off state of the contact micro-switch, upon the movable contact reaching the open position, the mechanical switch is turned off, so that the solid-state circuit breaker is turned off, and the handle stops at the off position.

14. The solid-state circuit breaker according to claim 1, comprising a plurality of breaking units and a drive linkage configured to synchronize the plurality of breaking units, wherein the drive linkage is connected to the plurality of breaking units and configured to link movable contacts of the plurality of breaking units.

15. A circuit breaker comprising an electronic switch and a mechanical switch connected in series, wherein the mechanical switch comprises:

a housing;

a handle coupled to the housing;

a first conductive element disposed in the housing and configured to make electrical contact with a second conductive element; and a transmission assembly disposed in the housing and configured to transmit motion of the handle to at least the first conductive element, wherein the handle is capable of engaging in:

a first position in which:

the first conductive element is in electrical contact with the second conductive element;

a second position in which:

the first conductive element is not in electrical contact with the second conductive element; and the transmission assembly is in a tripping state; and a third position in which:

the first conductive element is not in electrical contact with the second conductive element; and the transmission assembly is in a non-tripping state.

16. The circuit breaker of claim 15, wherein the mechanical switch is configured to:

upon a trip of the circuit breaker when the handle is engaged in the first position, transition the handle to engage in the second position such that the transmission assembly is in the tripping state.

17. The circuit breaker of claim 16, wherein:

the second position is between the first position and the third position;

when the transmission assembly is in the tripping state, the transmission assembly prevents the handle from transitioning to engage in the first position; and when the transmission assembly is in the non-tripping state, the transmission assembly prevents the handle from transitioning to engage in the second position.

18. The circuit breaker of claim 17, further comprising a set of microswitches configured to transmit electrical signals indicative of a position of the handle and/or contact between the first conductive element and the second conductive element.

19. The circuit breaker of claim 18, wherein:

the circuit breaker is on when the mechanical switch is on and the electronic switch is on;

the mechanical switch is on when the first conductive element is in electrical contact with the second conductive element; and the circuit breaker is configured, based on the electrical signals from the set of microswitches, such that:

when the circuit breaker is switched from off to on, the mechanical switch is switched on before the electronic switch is switched on; and when the circuit breaker is switched from on to off, the electronic switch is switched off before the electronic switch is switched off.

20. The circuit breaker of claim 19, wherein:

when the circuit breaker is electrically switched from on to off:

the electronic switch is turned off; and responsive to the electronic switch being turned off, the transmission assembly transitions the handle to engage in the second position; and when the circuit breaker is mechanically switched from on to off:

the handle is transitioned to engage in the second position or in the third position; and responsive to the electrical signals from the set of microswitches, the electronic switch is turned off before the handle engages in the second position or the third position.

* * * * *